United States Patent [19]
Saitoh et al.

[11] Patent Number: 4,996,829
[45] Date of Patent: Mar. 5, 1991

[54] LAWN MOWER WITH BLOWER

[75] Inventors: Gunji Saitoh; Akira Amano; Yasunori Sakamoto, all of Saitama; Masayuki Ota; Hiroaki Shinoki, both of Tokyo; Tomomi Nakaya; Tsuyoshi Kawabata, both of Chiba; Yasushi Suganuma, Tokyo; Masafumi Araki; Shinjirou Konno, both of Saitama, all of Japan

[73] Assignee: Honda Giken Kogyo Kabushiki Kaisha, Tokyo, Japan

[21] Appl. No.: 422,224

[22] Filed: Oct. 16, 1989

[30] Foreign Application Priority Data

| Oct. 17, 1988 | [JP] | Japan | 63-261084 |
| Mar. 31, 1989 | [JP] | Japan | 1-82976 |
| Mar. 31, 1989 | [JP] | Japan | 1-39000 |
| Mar. 31, 1989 | [JP] | Japan | 1-39001 |
| Apr. 3, 1989 | [JP] | Japan | 1-84589 |
| Apr. 3, 1989 | [JP] | Japan | 1-39298 |
| Apr. 3, 1989 | [JP] | Japan | 1-39299 |
| Apr. 3, 1989 | [JP] | Japan | 1-39300 |

[51] Int. Cl.⁵ ............................................. A01D 34/70
[52] U.S. Cl. ..................................... 56/13.3; 56/16.6; 56/202; 56/320.2
[58] Field of Search ...................... 56/12.8, 13.4, 13.3, 56/16.4, 16.6, 202, 320.2; 474/148

[56] References Cited

U.S. PATENT DOCUMENTS

| 3,091,906 | 6/1963 | Hall | 56/13.4 |
| 3,316,696 | 5/1967 | Florido | |
| 3,657,865 | 4/1972 | Ober | 56/13.3 |
| 4,114,353 | 9/1978 | Ansbaugh et al. | 56/13.3 |
| 4,310,998 | 1/1982 | Cuba | 56/202 |
| 4,433,532 | 2/1984 | McCunn | 56/320.2 |
| 4,488,395 | 12/1984 | Mack | 56/13.4 |
| 4,614,080 | 9/1986 | Hoepfner et al. | 56/16.6 |
| 4,693,063 | 9/1987 | Hoepfner et al. | 56/16.6 |
| 4,700,534 | 10/1987 | Reilly | 56/13.3 |
| 4,711,073 | 12/1987 | Freier, Jr. et al. | 56/13.3 |
| 4,735,037 | 4/1988 | Benter | 56/13.3 |
| 4,773,205 | 9/1988 | Hansen et al. | 56/13.3 |
| 4,881,362 | 11/1989 | Parker et al. | 56/202 |
| 4,905,461 | 3/1990 | Heller | 56/12.8 |

FOREIGN PATENT DOCUMENTS

| 921873 | 3/1963 | United Kingdom . |
| 1063288 | 3/1967 | United Kingdom . |
| 2196825 | 5/1988 | United Kingdom . |

Primary Examiner—Ramon S. Britts
Assistant Examiner—Terry L. Melius
Attorney, Agent, or Firm—Irving M. Weiner; Joseph P. Carrier; Pamela S. Burt

[57] ABSTRACT

A riding lawn mower comprises a frame supported by wheels, a mower housing carried at the underside of the frame, a plurality of cutter blades located within the mower housing to cut grass, a collection bag mounted on the rear of the frame, a discharge chute extending between the mower housing and the collection bag and defining a clipping path from the cutter blades into the collection bag, a blower including an impeller housing attached to the mower housing and an impeller located within the impeller housing and cooperating with the butter blades to convey the grass clippings into the collection bag through the discharge chute. A short conduit connects the impeller housing to the upstream end of the discharge chute to conduct an air generated by the impeller into the discharge chute. A central axis of the conduit is offset downwardly from a central axis of the discharge chute.

15 Claims, 10 Drawing Sheets 4,996,829

1

LAWN MOWER WITH BLOWER

BACKGROUND OF THE INVENTION

1. Field of the Invention

The present invention relates generally to a riding type lawn mower for cutting grass or similar material and collecting the grass clippings into a collection bag, and more particularly to an air assist mechanism or blower adapted for attachment to such lawn mower for the purpose of aiding in the conveyance of the grass clippings through a discharge chute.

2. Description of the Prior Art

It is well known to provide lawn mowers, especially of the riding type, with blowers intended to enhance the movement of glass clippings from a mower into a receptacle. U.S. Pat. No. 4,114,353 discloses a riding lawn mower wherein a rotary mower is mounted at the underside of a riding vehicle and includes a mower housing within which a plurality of cutter blades are located to cut grass or similar material. A conduit leads from a discharge opening at one side of the mower housing to a collection bag. A blower is positioned in the passageway or within the conduit to receive the grass clippings thrown out of the discharge opening of the mower housing by the cutter blades and propel such clippings upwardly through the conduit and into the collection bag. A disadvantage of this arrangement is that since the blower is directly attached to the mower housing and receives or draws the grass clippings from the mower housing, plugging of the clippings tends to occur particularly at the intake of the blower.

SUMMARY OF THE INVENTION

It is, therefore, an object of the present invention to provide a lawn mower with a blower, which enables constant and non-plugging flow of clippings throughout a clipping path.

According to one aspect of the present invention, there is provided a riding lawn mower comprising a frame supported by front and rear wheels, drive means for driving the rear wheels, a mower housing carried at the underside of the frame, a plurality of cutter blades located within the mower housing to cut grass, a collection bag mounted on the rear of the frame, a discharge chute extending between the mower housing and the collection bag and defining a clipping path from the cutter blades into the collection bag, a blower including an impeller housing attached to the mower housing and an impeller located within the impeller housing and cooperating with the cutter blades to convey the grass clippings into the collection bag through the discharge chute. A short conduit or pipe connects the impeller housing to the upstream end of the discharge chute to conduct an airflow generated by the impeller into the discharge chute. A central axis of the conduit is offset downwardly from a central axis of the discharge chute. This arrangement is intended to provide a strong spiral airflow in the discharge chute. The blower is located externally of the clipping path and does not receive or draw the grass clippings. Therefore, no plugging of the grass clippings occurs in the impeller housing.

Each cutter blade is secured to an upright blade shaft which is, in turn, rotatably mounted in the mower housing. A fan is coaxially secured to the blade shaft, preferably one located nearest the discharge opening of the mower housing to provide a supplemental airflow to aid in the discharge of all the grass clippings out of the mower housing.

BRIEF DESCRIPTION OF THE DRAWINGS

A better understanding of the invention may be had by reference to the accompanying drawings, in which.

DESCRIPTION OF THE PREFERRED EMBODIMENTS

Figure 1:
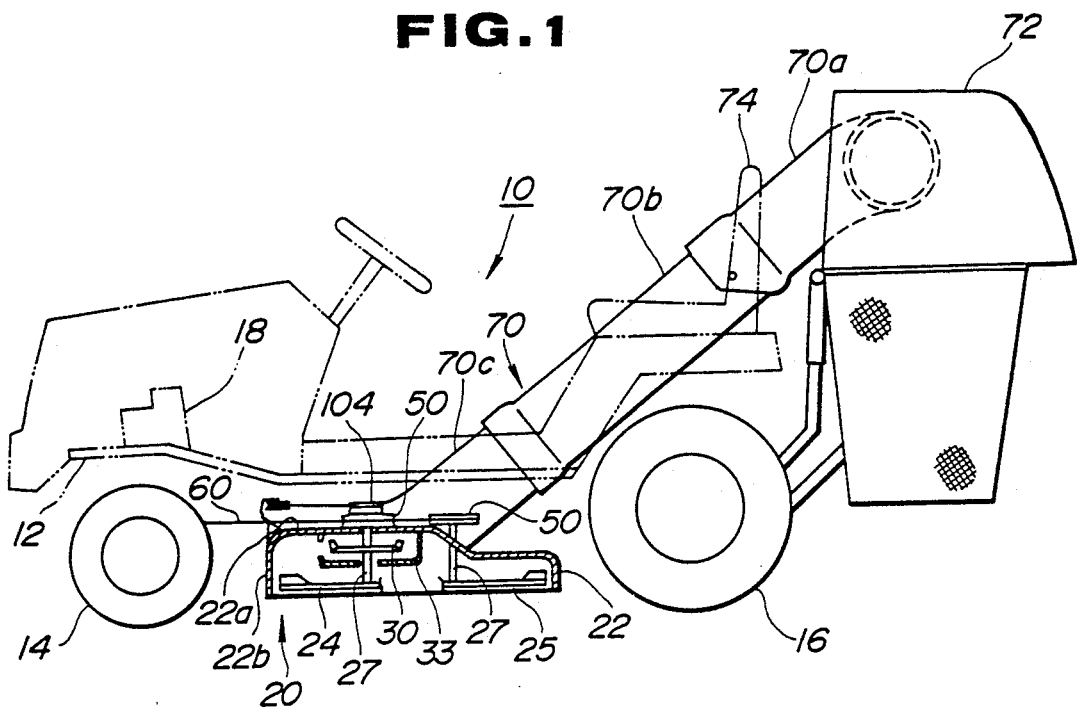
FIG. 1 is a schematic side view of a riding lawn mower, with a rotary mower shown in section, according to the present invention.
Figure 2:
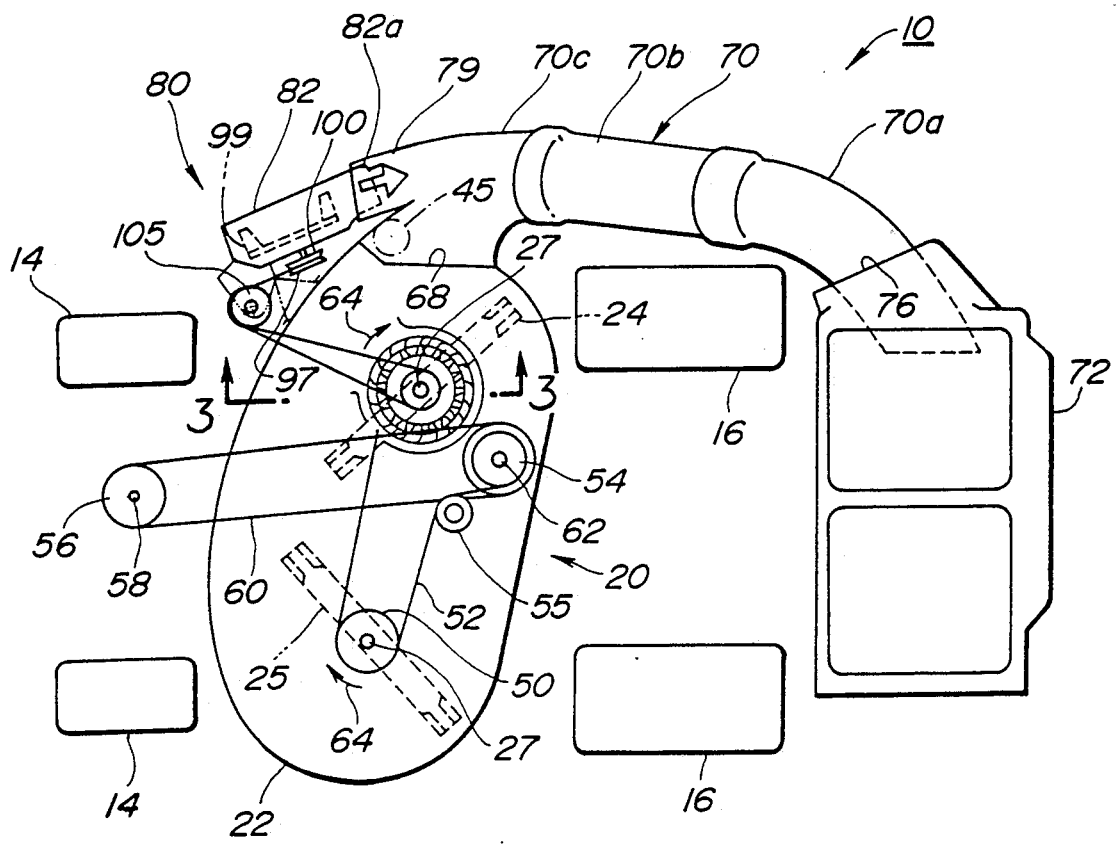
FIG. 2 is a schematic plan view of the lawn mower with frame and some other components removed for clarity.

Referring to FIGS. 1 and 2, there is schematically shown a riding vehicle or lawn mower generally indicated at 10. The riding lawn mower 10 includes a generally horizontal frame 12 supported by front wheels 14 and rear wheels 16. A power source, such as an internal combustion engine 18, is mounted on the frame 12 to drive the rear wheels 16.

Figure 3:
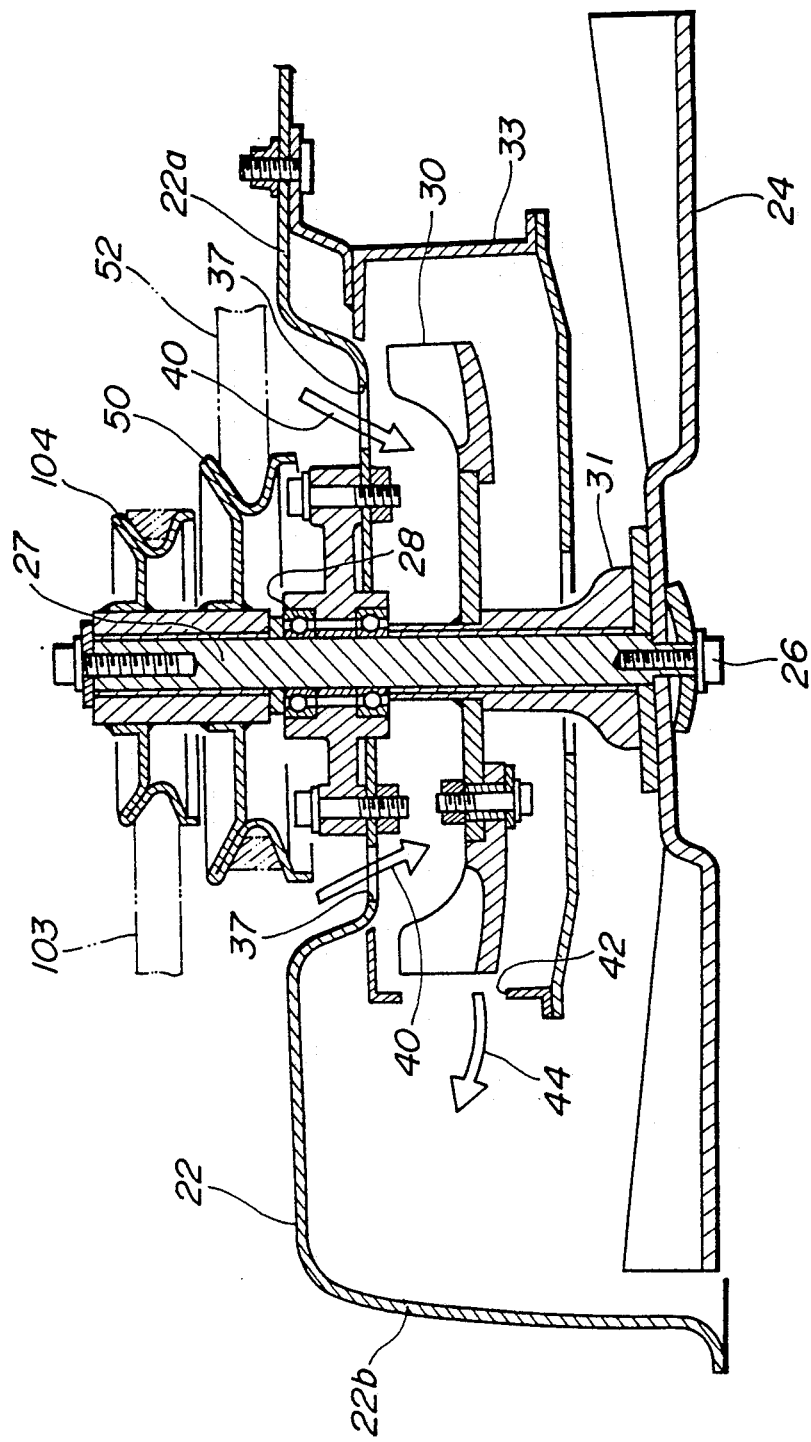
FIG. 3 is a sectional view, on an enlarged scale, taken along the line 3—3 of FIG. 2, showing a right cutter blade in detail.

A rotary mower, as generally indicated at 20, is carried at the underside of the frame 12 between the front wheels 14 and the rear wheels 16. The mower 20 has a mower housing 22 of a generally elliptical shape with its rear straightened as viewed in plan. The mower housing 22 has a top wall 22a and a skirt wall 22b depending from the top wall 22a. Located within the mower housing 22 are right and left cutter blades 24 and 25 rotating in a horizontal plane to cut grass or similar matter. The left cutter blade 25 is located partially forwardly of the right cutter blade 24, and the orbits of these blades partly overlap as viewed in plan. It is to be understood that the number of cutter blades may vary from a single blade to two or more blades. As best seen in FIG. 3, the right cutter blade 24 is secured by a bolt 26 to the bottom of an upright blade shaft 27 which extends upwardly through the top wall 22a of the housing 22 and is journaled therein by a suitable bearing assembly 28.

Coaxially mounted on the blade shaft 27 is a fan 30 operable to generate a supplemental airflow. Specifically, the fan 30 is fixed to a collar 31 which is, in turn, keyed to the lower end of the blade shaft 27 above the cutter blade 24. A generally cylindrical casing 33 is arranged within the mower housing 22 to enclose the fan 30. Formed in the top wall 22a of the mower housing 22 are a plurality of air inlets 37 through which air is introduced into the interior of the casing 33 in the direction of the arrows 40. Upon rotation of the fan 30, the air is forcibly directed out of the casing 33 through an air outlet 42 formed in the side wall of the casing 33 in the direction of the arrow 44. When grass is to be cut shorter, the cutter blades have to be lowered or positioned closer to the ground. This results in less intake of air into the mower housing, causing some of the grass clippings to be left in an area, as circled at 45 in FIG. 2, where no supplemental airflow from a blower is expected. The airflow produced by the fan 30 will aid in the discharge of such grass clippings out of the mower housing 22. The left cutter blade 25, which is similar in structure to the right cutter blade 24 except that it does not carry a fan assembly, will not be explained herein.

Returning to FIG. 2, a pulley 50 is attached to each blade shaft 27 where it protrudes from the mower housing 22. An endless drive belt 52, such as V-belt, extends around these pulleys 50 and a driven pulley 54. A pulley 55 located adjacent to the driven pulley 54 also engages the drive belt 52 to vary the tension in the belt 52. A drive pulley 56 is attached to a power takeoff shaft 58 which is driven by the engine 18. Another drive belt 60 is trained around the drive pulley 56 and the driven pulley 54 to transmit power from the power takeoff shaft 58 to a shaft 62 to which the driven pulley 54 is attached. Upon rotation of the drive pulley 56, the two cutter blades 24 and 25 are rotated in the direction indicated by the arrow 64.

At one side of the mower 20, there is provided in the skirt wall 22b of the mower housing 22 a discharge outlet or opening 68 through which grass clippings produced by the mower 20 pass out of the mower housing 22. As shown in FIGS. 1 and 2, the lawn mower 10 includes a clipping conduit or discharge chute generally indicated at 70 and extending along the side of the lawn mower 10 to which the discharge opening 68 of the mower housing 22 opens. The discharge chute 70 extends rearwardly and upwardly for conducting the grass clippings to a collection bag 72 mounted on the rear of the frame 12 behind the seat 74 and defines a clipping path from the cutter blades into the collection bag 72. A rear section 70a of the discharge chute 70 has one end bent inwardly of the vehicle to extend into an opening 76 in the right side of the collection bag 72, and the other end connected to one end of a medial section 70b of the discharge chute 70. The medial section 70b is in the form of a straight length of tubing and has its upstream end connected to one end of a front section 70c. The upstream end of the front section 70c is bent inwardly of the vehicle and joined to the discharge opening 68 of the mower housing 22 to receive the grass clippings therefrom. A short conduit or pipe 79 extends between the front section 70c of the discharge chute 70 and a blower as generally indicated at 80.

Figure 4:
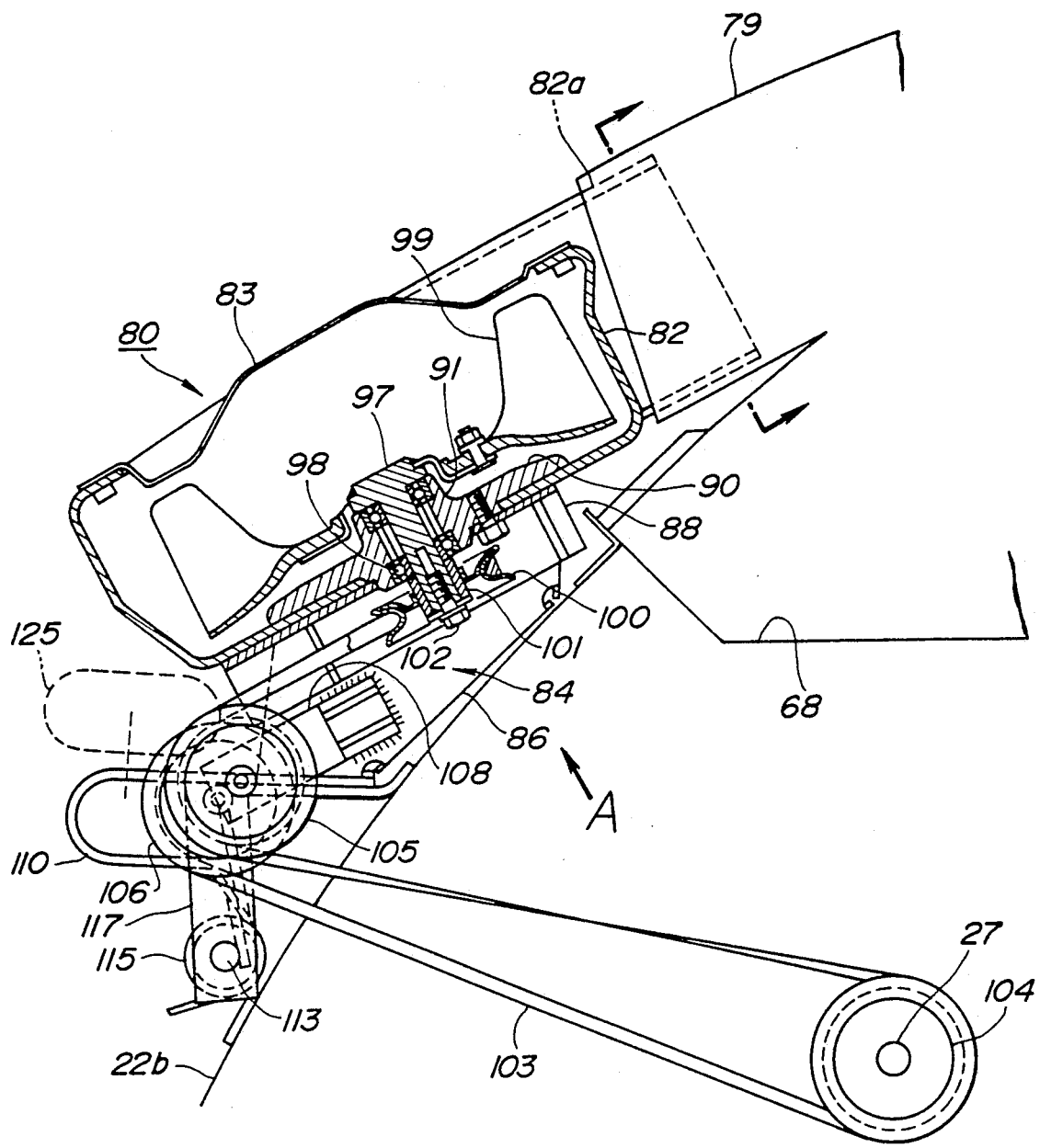
FIG. 4 is a sectional plan view, on an enlarged scale, of a blower and a belt and pulley power transmission.
Figure 5:
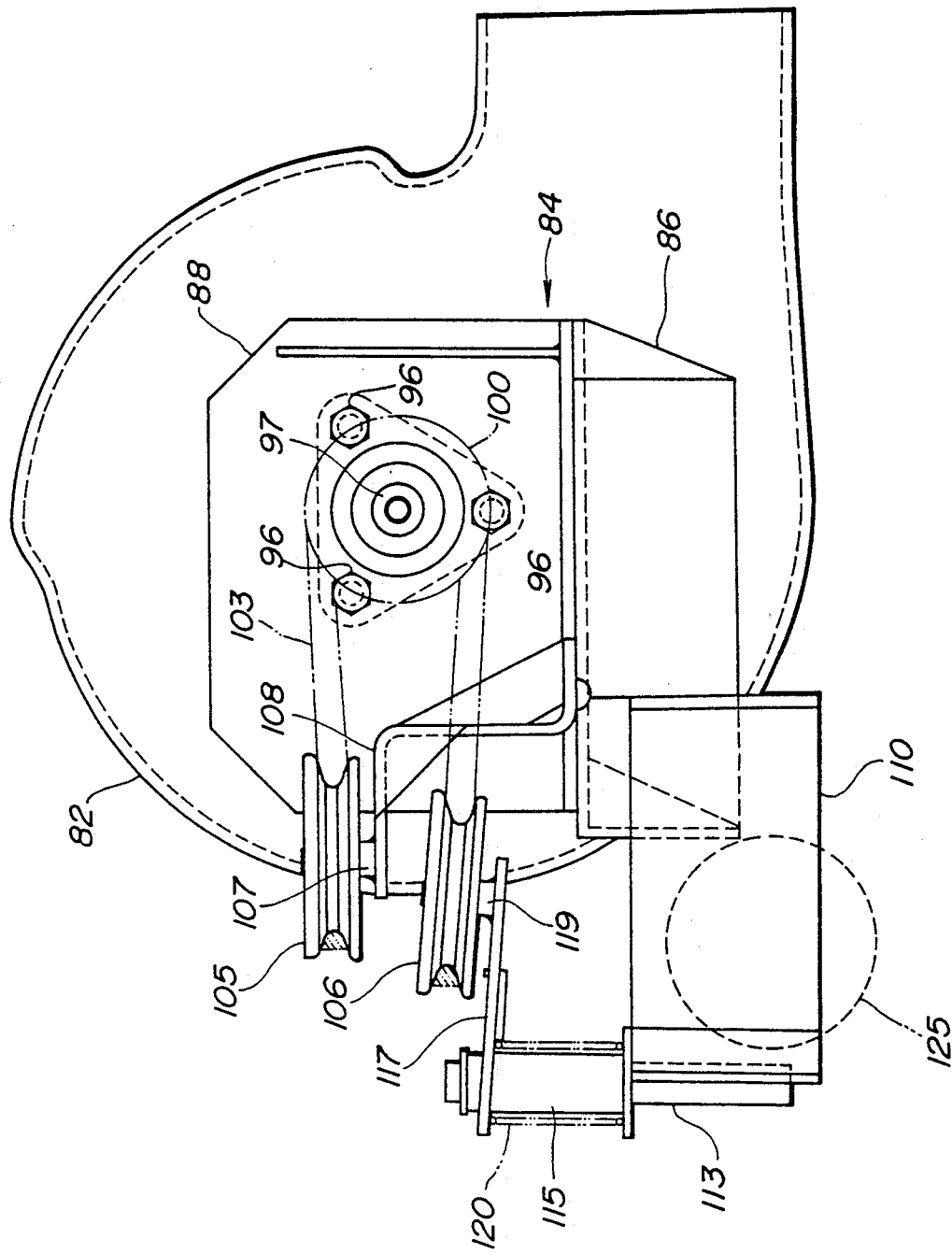
FIG. 5 is a view of the blower and the belt and pulley power transmission as seen in the direction of the arrow A in FIG. 4.
Figure 6:
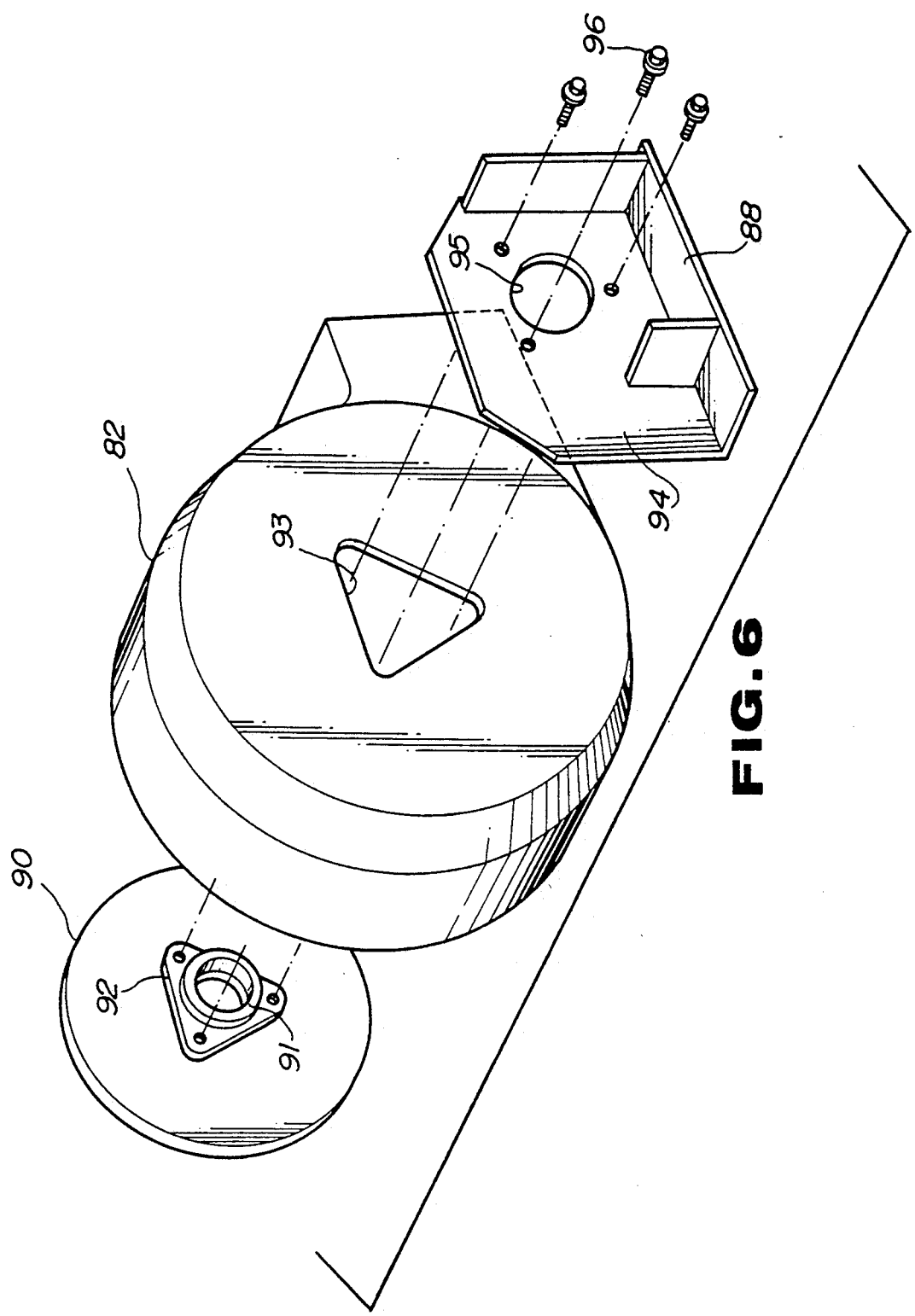
FIG. 6 is a disassembled view of part of a mount assembly for the blower.

As shown in FIGS. 4 and 5, the blower 80 is located adjacent to the discharge opening 68 of the mower housing 22 and has a pan-shaped impeller housing 82. This housing 82 is provided with a cover 83 for the purpose of safety and is secured to the skirt wall 22b of the mower housing 22 by a mount assembly as generally indicated at 84. Specifically, the mount assembly 84 includes a first bracket 86 fixed to the skirt wall 22b of the mower housing 22, and a second bracket 88 secured to the first bracket 86 and adapted to cooperate with a bearing housing 90 to sandwich the impeller housing 82 therebetween. It is to be understood that the first bracket 86 and the second bracket 88 may be formed in an integral fashion. As best seen in FIG. 6, the bearing housing 90 is generally in the form of a disk and has a central opening through which a cylindrical element 91 extends. A triangular element 92 is integrally formed on the inner surface of the bearing housing 90 in surrounding relation to the cylindrical element 91. The impeller housing 82 has at its bottom a triangular opening 93 to which the triangular element 92 is fitted. It is to be understood that the shape of the opening 93 and the triangular element 92 can vary as far as the bearing housing 90 is immovably assembled to the impeller housing 82. The second bracket 88 includes a supporting plate 94 having a circular opening 95 to which the cylindrical element 91 of the bearing housing 90 is fitted for positioning purposes. Three bolts 96 are used to secure the bearing housing 90, the impeller housing 82 and the second bracket 88 together. This arrangement facilitates positioning and mounting of the impeller housing 82 to the mower housing 22.

As best seen in FIG. 4, an impeller shaft 97 extends through the outer end of the cylindrical element 91 of the bearing housing 90 and is journaled therein by bearings 98. A plurality of vanes 99 are secured to the outer end of the impeller shaft 97 where it protrudes from the bearing housing 90 and are encased within the impeller housing 82. A belt and pulley power transmission is used to transmit power from the blade shaft 27 for the right cutter blade 24 to the impeller shaft 97. Thus, the impeller shaft 97 is driven by the same power source that drives the blade shafts 27. Specifically, a pulley 100 is fixed to a collar 101 which is, in turn, fitted over the inner end of the impeller shaft 97 and secured thereto by a bolt 102. An endless V-belt 103 is trained around the pulley 100 and a pulley 104 which is mounted to the blade shaft 27 above the pulley 50. Also, idler pulleys 105 and 106 engage the V-belt 103. The pulley 105 is rotatably mounted on a shaft 107 which extends vertically from an extension 108 which is, in turn, welded to the first bracket 86. A third bracket 110 is attached to the skirt wall 22b of the mower housing 22. Welded or otherwise secured to the third bracket 110 is a support shaft 113 over which a collar 115 is rotatably fitted. A supporting plate 117 is fixed to the upper end of the collar 115 and has a fixed shaft 119 on which the pulley 106 is rotatably mounted. As best seen in FIG. 5, a spring 120 is disposed between the supporting plate 117 and the third bracket 110 so as to normally bias the pulley 106 toward the front wheels 14. The pulley 106 thus serves to apply tension to the belt 103.

Figure 7:
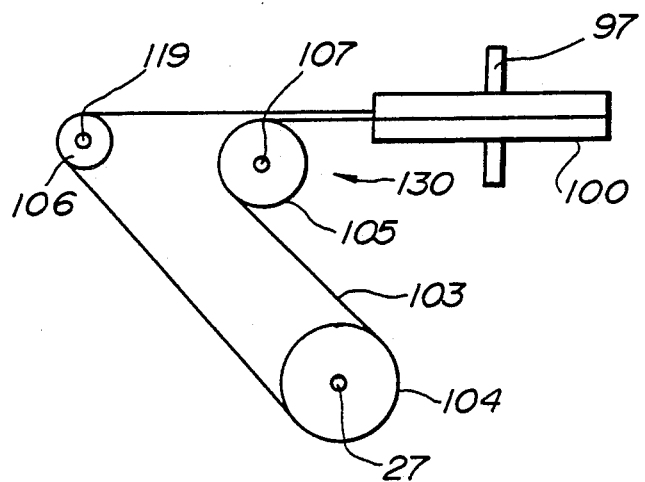
FIG. 7 is a schematic view of the belt and pulley power transmission.
Figure 8:
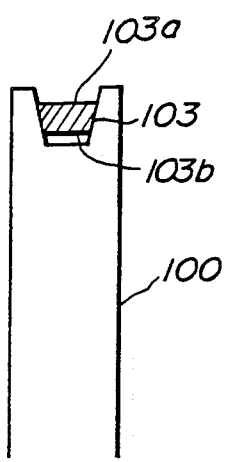
FIGS. 8 through 10 show the manner in which a V-belt engages the pulleys of the power transmission.
Figure 9:
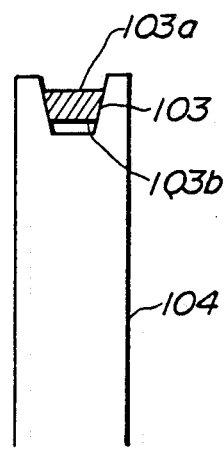
Figure 10:
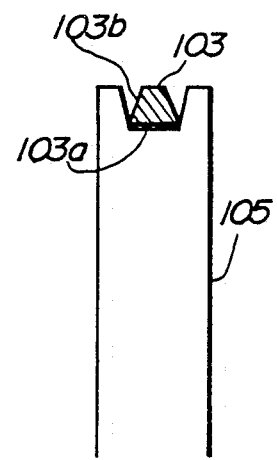
Figure 11:
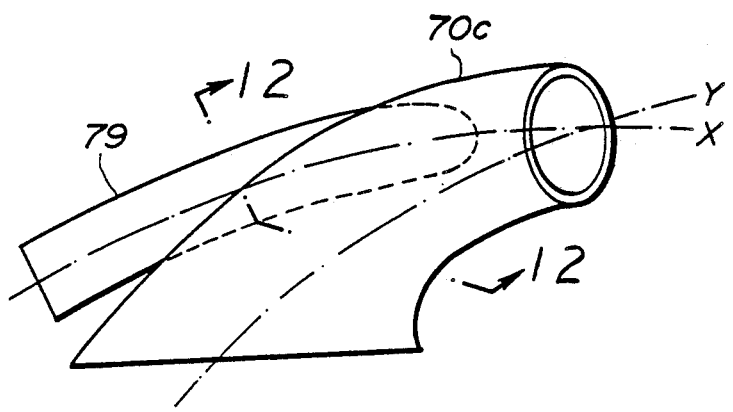
FIG. 11 is a schematic view of the front section of a discharge chute.
Figure 13:
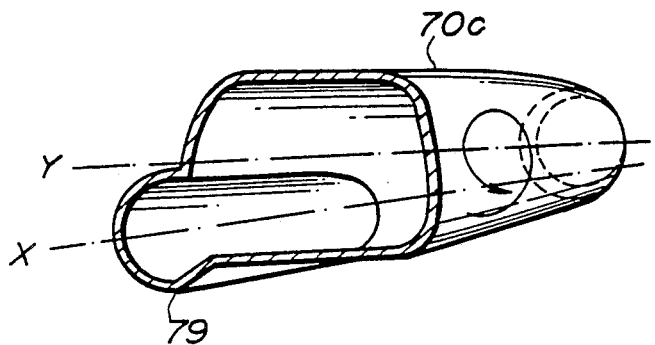
FIG. 13 is a perspective view of the front section the discharge chute.
Figure 12:
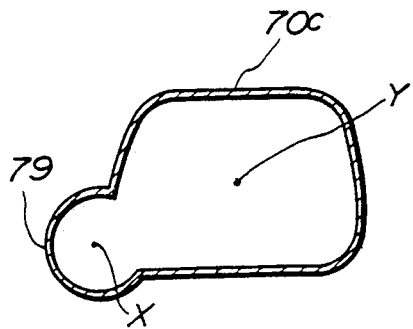
FIG. 12 is a view taken along the line 12—12 of FIG. 11.

The pulley 105 is used not only to apply tension in the belt 103, but also to change the direction of the belt 103 between the pulley 100 rotating on a horizontal axis and the pulley 104 rotating on a vertical axis. As shown in FIG. 7, when the pulley 105 engages the V-belt 103 in the direction of the arrow 130, the V-belt 103 engages the pulleys 100 and 104 in a normal fashion (see FIGS. 8 and 9). That is, a narrow surface 103b of the V-belt faces or engages the bottom of an annular groove in each of those pulleys. However, the V-belt 103 engages the pulley 105 in an inverted fashion (FIG. 10). That is, a wide surface 103a faces or abuts the bottom of an annular groove in the pulley 105. To this end, in the illustrated embodiment of FIG. 4, the V-belt 103 is preferably twisted or turned approximately 180° between the pulleys 104 and 105 and approximately 90° both between the pulleys 100 and 105 and between the pulleys 100 and 106 so that is engages the pulley 105 in a normal fashion, i.e. with the narrow surface 103b engaging the bottom of the annular groove in pulley 105. This arrangement helps the belt to last longer in that each side of the belt is always subject to the same force, either tensile force or compressive force.

The impeller housing 82 has a generally rearwardly extending air duct 82a (see FIG. 2) through which a strong airflow is supplied to aid in the conveyance of the grass clippings ejected from the mower housing 22 through the chute 70. As shown in FIGS. 2, 4 and 11 to 13, the short conduit or pipe 79 connects the impeller housing 82 to the upstream end of the front section 70c of the chute 70. A central axis X of the conduit 79 is offset, preferably downwardly, from a central axis Y of the front section 70c of the discharge chute 70 (see FIG. 12). This arrangement provides a strong spiral airflow in the discharge chute 70 after a stream of air from the blower 80 is introduced into the discharge chute 70. This spiral airflow will effectively move grass clippings which may be attached to the inner wall of the chute 70 and convey all the grass clippings into the collection bag 72. It will be understood that the impeller housing 82 may be detachably mounted to the discharge chute 70 or the conduit 79.

A caster 125 is carried by the mower housing 22 through the bracket 110 so as to provide a balancing support for the mower housing 22.

Figure 14:
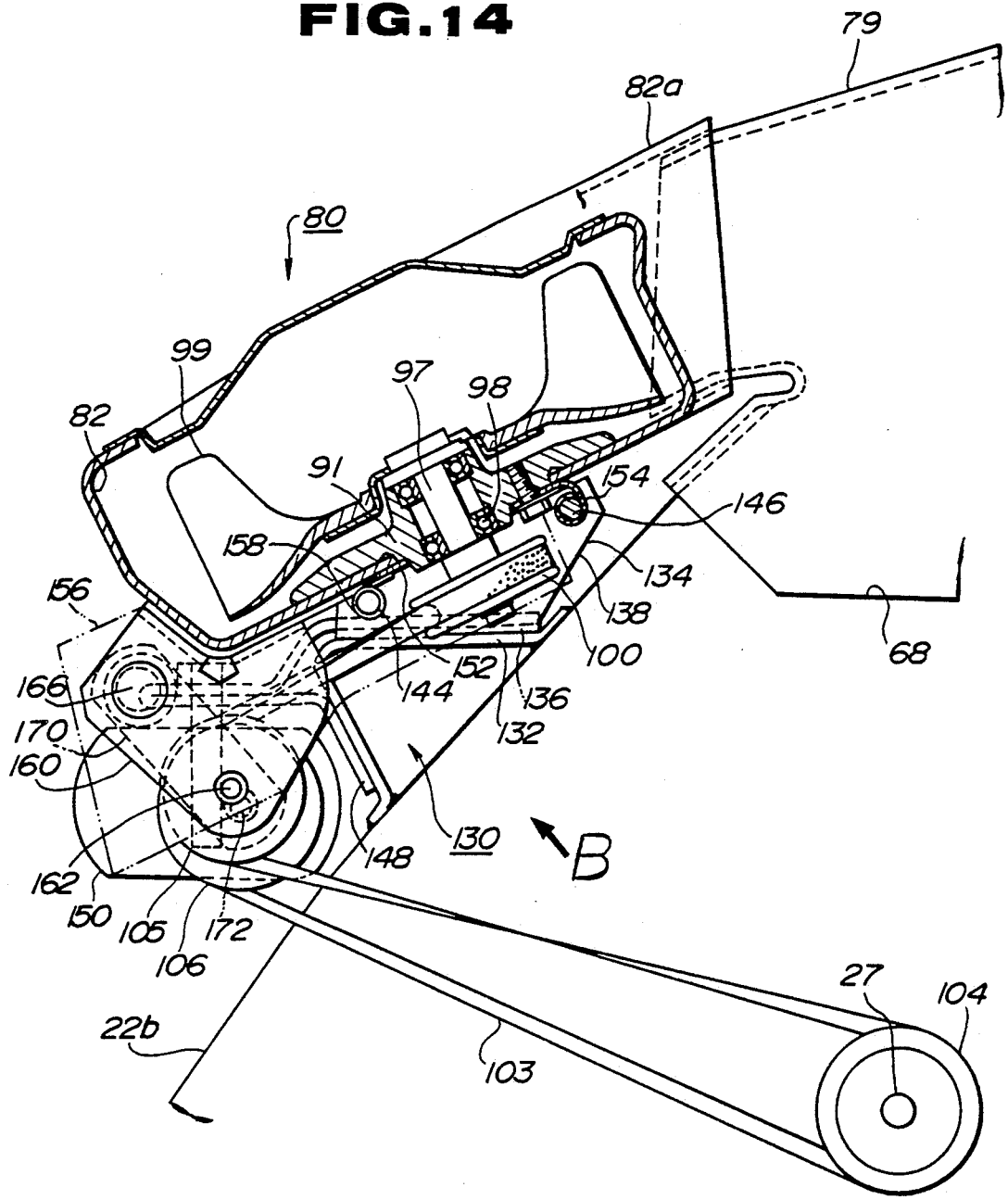
FIG. 14 is a view similar to FIG. 4, but showing a modified form of the mount assembly.
Figure 15:
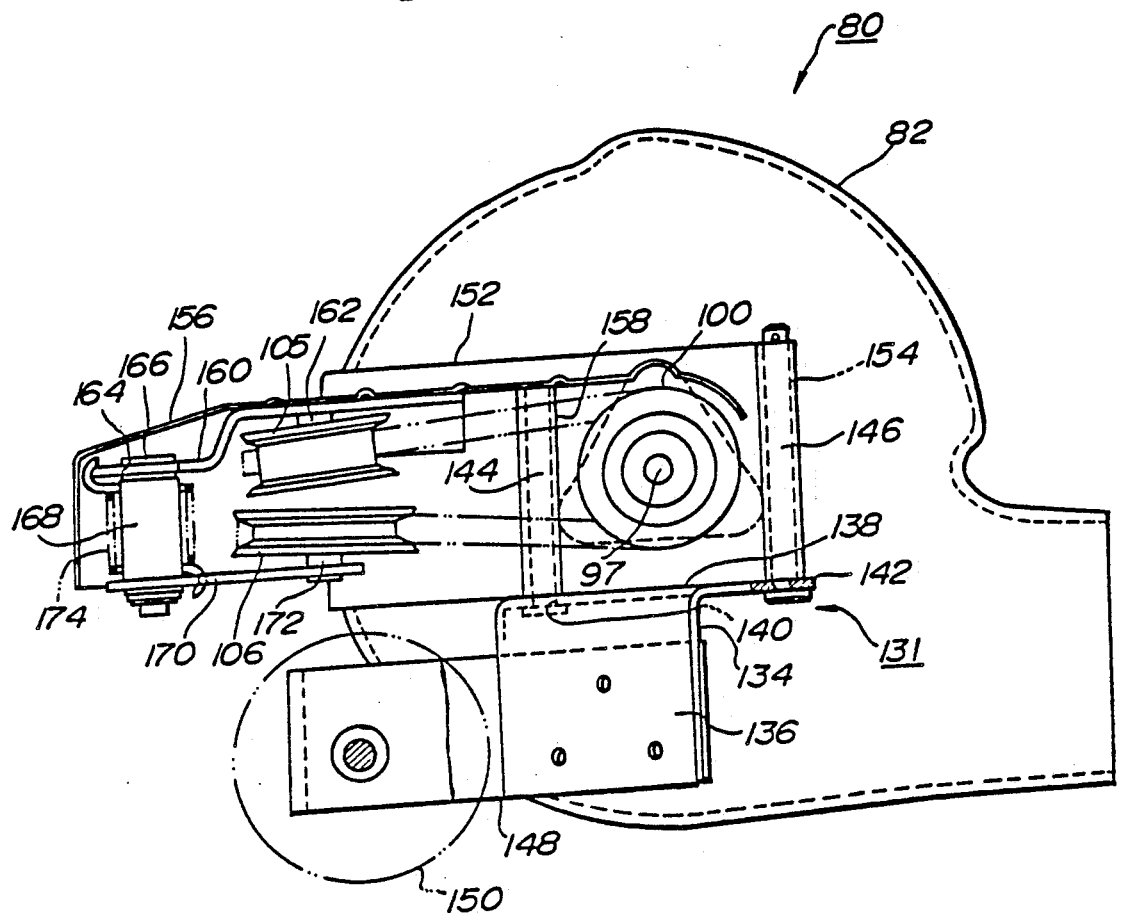
FIG. 15 is a view of the mount assembly as seen in the direction of the arrow B in FIG. 14.

A modified form of the mount assembly is shown in FIGS. 14 and 15 wherein like reference numerals designates like or corresponding parts shown in FIGS. 4 and 5. A mount assembly, as generally indicated at 131, includes a V-shaped first bracket 132 fixed to the skirt wall 22b of the mower housing 22. A second bracket 134 includes a vertical plate 136 fixed to one side of the first bracket 132 and a horizontal plate 138 having two openings 140 and 142 through which two corresponding pins 144 and 146 extends upwards. Also, secured to the first bracket 132 is a third bracket 148 having a Y-shape and carrying a roller or caster 150 to provide a balancing support for the mower housing 22. Bolted to the side of the impeller housing 82 is a rectangular plate 152 having one side rounded to form a tubular portion 154 into which the pin 146 is fitted. A cover 156 is secured to the rectangular plate 152 and has a tubular portion 158 extending downwardly to receive the pin 144. This arrangement facilitates mounting of the impeller housing 82 to the mower housing 22. It will be understood to one skilled in the art that a plurality of tubes may be formed in the brackets or directly in the mower housing, and the impeller housing may carry a corresponding number of pins for engagement with the tubes.

A first support 160 is secured to the cover 156 and has a slightly inclined shaft 162 on which the pulley 105 is rotatably mounted. The first support 160 has at its forward end an opening 164 through which a shaft 166 extends downwards. A collar 168 is rotatably fitted around the shaft 166. Fixed to the lower end of the collar 168 is a second support 170 having a fixed shaft 172 on which the pulley 106 is rotatably mounted. A spring 174 is disposed between the first support 160 an the second support 170 to normally bias the pulley 106 toward the front wheels 14 (see FIG. 2) to apply tension to the V-belt 103. The impeller housing 82 and the pulleys 105 and 106 are, thus, integrally assembled as a single unit. This unit can be easily attached to the mower housing 22 by inserting the pins 144 and 146 into the tubes 154 and 158, respectively.

Figure 17:
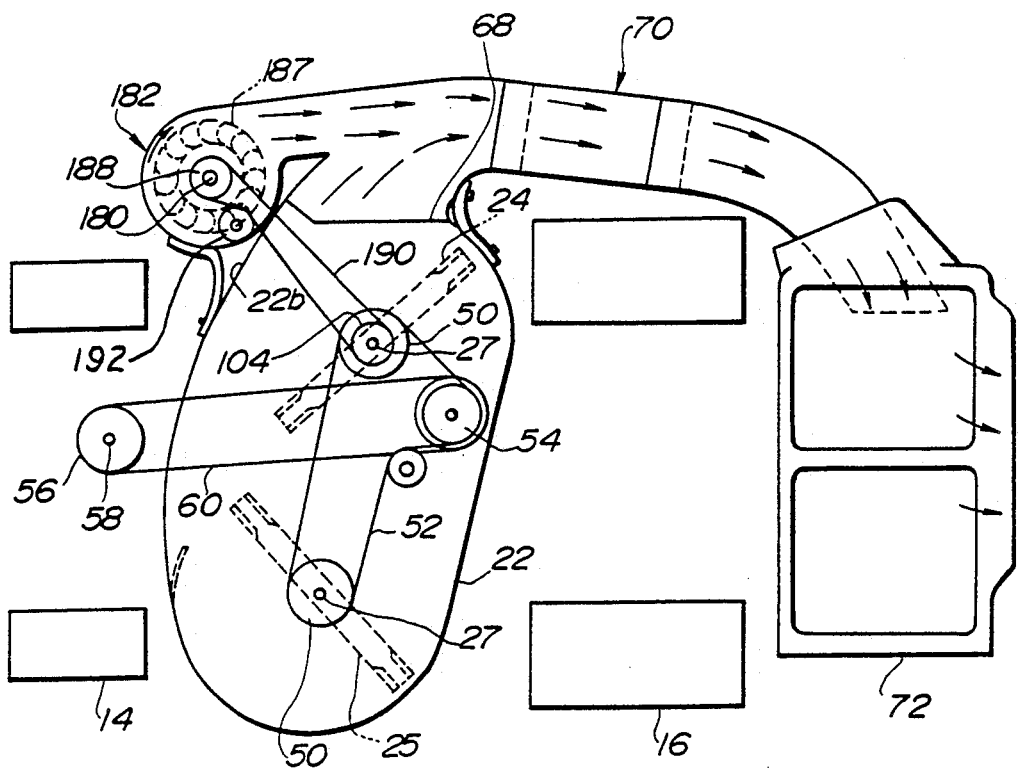
FIGS. 16 and 17 are views similar to FIGS. 1 and 2, but showing a modification of the riding lawn mower.
Figure 16:
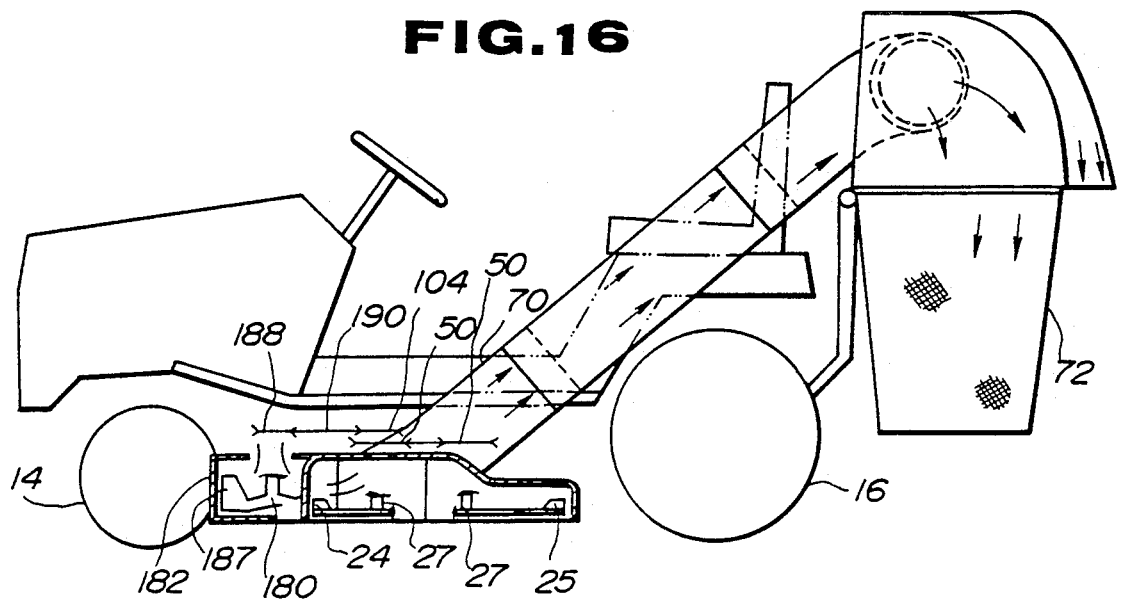

Referring to FIGS. 16 and 17, wherein like reference numerals designate like or corresponding parts shown in FIGS. 1 and 2, an impeller shaft 180 can be mounted for rotation about a vertical axis. A generally pan-shaped impeller housing 182 is attached to the skirt wall 22b of the mower housing 22 through a suitable bracket assembly (not shown). A plurality of vanes 187 are attached to the lower end of the impeller shaft 180. A pulley 188 is secured to the upper end of the impeller shaft 180. An endless belt 190, such as V-belt, is trained around the pulley 188 and the pulley 104 to transmit power from the blade shaft 27 for the right cutter blade 24 to the impeller shaft 180. An idler pulley 192 also engages the belt 190 to vary the tension in the belt. The operation and construction of other components are substantially identical to the foregoing embodiment and, therefore, will not be explained herein.

It will be understood that the invention is not to be limited to the details above described in relation to the preferred embodiment, but may be modified within the scope of the following claims.

What is claimed is:

1. A riding lawn mower comprising:
   a frame supported by wheels;
   a mower housing carried by said frame and including a side wall having a discharge opening defined therein;
   cutter means located within said mower housing for cutting grass;
   means for rotating said cutter means;
   collection means carried by said frame for collecting grass clippings cut by said cutter means;
   a discharge chute extending between said discharge opening of the mower housing and said collection means and defining a clipping path from said cutter means into said collection means;
   blower means located adjacent to said mower housing for cooperating with said cutter means to convey said grass clippings into said collection means through said discharge chute, said blower including an impeller housing and impeller means located within said impeller housing for generating an airflow; and
   means for rotating said impeller means;
   said blower means being connected to said discharge chute and located externally of said clipping path; and
   said impeller housing being connected to said discharge chute external of and adjacent to said discharge opening of the mower housing in such manner that said airflow flows directly into said clipping path in a direction substantially identical to the direction in which said grass clippings flow from said discharge opening to said discharge chute.

2. A riding lawn mower according to claim 1, wherein:
   said blower means further comprises and air duct for conducting said airflow generated by said impeller means into said discharge chute, said air duct extends in a straight manner from said impeller housing to said discharge chute and is formed as an integral unitary member with at least a part of said discharge chute, said air duct having a central axis offset from a central axis of said discharge chute.

3. A riding lawn mower according to claim 2, wherein said central axis of said conduit is offset downwardly from said central axis of said discharge chute.

4. A riding lawn mower according to claim 1, wherein said cutter means includes at least one blade shaft rotatably mounted in said mower housing and at least one cutter blade secured to said at least one blade shaft, and wherein a fan is coaxially mounted to said at least one blade shaft.

5. A riding lawn mower according to claim 4, further including a casing arranged within said mower housing to enclose said fan, said mower housing having air inlet means and said fan casing having air outlet means with which said air inlet means of said mower housing is communicated.

6. A riding lawn mower according to claim 1, wherein said impeller means rotates on a horizontal axis.

7. A riding lawn mower according to claim 6, including:
bracket means for attaching said impeller housing to said mower housing and bearing means for rotatably supporting said impeller means;
said impeller housing includes an opening in one side thereof and said bearing means includes a projection fitted in said opening of said impeller housing whereby said bearing means is nonrotatably mounted to said impeller housing; and
said bearing means is fixedly secured to said bracket means.

8. A riding lawn mower according to claim 7, wherein said one side of said impeller housing is sandwiched between said bearing means and said bracket means.

9. A riding lawn mower according to claim 6, wherein;
said cutter means includes at least one upright blade shaft rotatably mounted in said mower housing;
said means for rotating said cutter means includes a pulley secured to one end of said upright blade shaft;
said impeller means includes a horizontal impeller shat rotatably mounted in said impeller housing;
said means for rotating said impeller means includes a pulley secured to one end of said horizontal impeller shaft, an endless belt having an inner side and an outer side, and idler pulley means having a first idler pulley and a second idler pulley;
said first and second idler pulleys being arranged to engage said endless belt from said inner side thereof; and
said endless belt being twisted between one of said first and second idler pulleys and said pulley secured to said upright blade shaft so that said inner side of said endless belt engages all of said pulleys.

10. A riding lawn mower according to claim 9, further including support means for rotatably supporting said first and second idler pulleys, said support means being secured to said impeller housing.

11. A riding lawn mower according to claim 1, wherein one of said impeller housing and said mower housing has at least one pin and the other has at least one hole defined therein for receiving said at least one pin therewithin whereby said impeller housing is attached to said mower housing.

12. A riding lawn mower according to claim 1, wherein said impeller housing is detachably connected to said discharge chute.

13. A riding lawn mower according to claim 2, wherein said cutter means includes a plurality of blade shaft rotatably mounted in said mower housing and a plurality of cutter blades secured to said blade shafts, respectively, and wherein a fan is coaxially mounted on one of said cutter blades disposed nearest the discharge outlet of said mower housing.

14. A riding lawn mower according to claim 1, including:
means for mounting said impeller housing to said mower housing, said mounting means including at least one tubular member and at least one pin selectively fittable in said at least one tubular member.

15. A riding mower according to claim 14, wherein:
said mounting means includes a first tubular member secured to said mower housing, a second tubular member secured to said impeller housing, and a pair of pins selectively fittable in said first and second tubular members, respectively.

* * * * *

UNITED STATES PATENT AND TRADEMARK OFFICE
CERTIFICATE OF CORRECTION

PATENT NO. : 4,996,829

DATED : MARCH 5, 1991

INVENTOR(S) : Saitoh et al.

It is certified that error appears in the above-identified patent and that said Letters Patent is hereby corrected as shown below:

In the Abstract, line 11, change "butter" to --cutter--.

Column 1, line 16, change "glass" to --grass--;
        line 21, change "material" to --materials--.

Column 2, line 31, after "section" insert --of--.

Column 5, line 5, change "is" to --it--.

Column 6, line 63 (Claim 2, line 3), change "and" to --an--.

Column 8, line 28 (Claim 13, line 3), change "shaft" to --shafts--.

Signed and Sealed this

First Day of September, 1992

*Attest:*

DOUGLAS B. COMER

*Attesting Officer*      *Acting Commissioner of Patents and Trademarks*